(12) United States Patent
Tsubone et al.

(10) Patent No.: US 11,467,796 B2
(45) Date of Patent: Oct. 11, 2022

(54) DISPLAY CONTROL SYSTEM, MOBILE BODY, DISPLAY CONTROL METHOD, DISPLAY DEVICE, DISPLAY METHOD, AND RECORDING MEDIUM

(71) Applicant: Panasonic Intellectual Property Management Co., Ltd., Osaka (JP)

(72) Inventors: Takashi Tsubone, Osaka (JP); Daisuke Misonoo, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/381,486

(22) Filed: Jul. 21, 2021

(65) Prior Publication Data

US 2021/0349673 A1 Nov. 11, 2021

Related U.S. Application Data

(63) Continuation of application No. PCT/JP2020/041837, filed on Nov. 10, 2020.

(30) Foreign Application Priority Data

Dec. 17, 2019 (JP) .............................. JP2019-227019

(51) Int. Cl.
*G06F 3/048* (2013.01)
*G06F 3/14* (2006.01)
(Continued)

(52) U.S. Cl.
CPC ............ *G06F 3/1446* (2013.01); *B60K 35/00* (2013.01); *G06F 3/1415* (2013.01); *G09G 5/363* (2013.01);
(Continued)

(58) Field of Classification Search
CPC ..... G09G 2300/0866; G09G 2330/021; G09G 2320/0233; G09G 2320/0247;
(Continued)

(56) References Cited

U.S. PATENT DOCUMENTS 8,189,679 B2 * 5/2012 Tsukagoshi ...... H04N 21/43072
370/537
2011/0157191 A1 * 6/2011 Huang .................. G06F 1/3203
345/503

(Continued)

FOREIGN PATENT DOCUMENTS

| JP | 2019-015801 | 1/2019 |
| WO | 2010/103827 | 9/2010 |

OTHER PUBLICATIONS

International Search Report issued in International Pat. Appl. No. PCT/JP2020/041837, dated Dec. 22, 2020, along with an English translation thereof.

*Primary Examiner* — Duc Q Dinh
(74) *Attorney, Agent, or Firm* — Greenblum & Bernstein, P.L.C.

(57) ABSTRACT

A display control system includes a plurality of display devices and a display controller (display device). The display controller generates a graphics command for each frame, and attaches, to the graphics command, time stamp corresponding to an order of generation of the graphics command. Each of the plurality of display devices: acquires the graphics command; performs, in parallel, first processing of acquiring only the time stamp attached to the graphics command in the order of generation and second processing of performing rendering processing based on the graphics command in the order of generation and acquiring the time stamp attached to the graphics command based on which the rendering processing is performed; and when a difference between the time stamp acquired in the first processing and
(Continued)

the time stamp acquired in the second processing exceeds a predetermined threshold value, performs reduction processing for reducing a load on the rendering processing.

11 Claims, 6 Drawing Sheets

(51) Int. Cl.
*B60K 35/00* (2006.01)
*G09G 5/36* (2006.01)

(52) U.S. Cl.
CPC .. *B60K 2370/1526* (2019.05); *B60K 2370/52* (2019.05); *G09G 2310/08* (2013.01); *G09G 2360/12* (2013.01)

(58) Field of Classification Search
CPC ........... G09G 2360/12; G09G 2360/06; G09G 2360/04; G09G 5/363; G09G 5/391; G09G 2360/08; G09G 2380/10; G06V 20/46; G06F 3/0484; G06F 3/1438; G06F 3/1454; G06F 16/583; G06F 16/23; G06F 16/90335; G06F 13/00; G06F 2212/455; G06F 3/064; G06F 1/3265; G06F 16/13; G06F 16/2228; G06F 16/2453; G06F 16/71; G06F 16/743; G06F 3/0631; G06F 1/3243; G06F 16/2308; G06F 16/2322; G06T 11/00; H04N 21/42653; H04N 21/8549; H04N 2201/327; H04N 21/8547; H04N 21/43072; H04N 21/44004; H04N 9/8042; H04N 5/232935; H04N 9/735; H04N 5/445; B60K 2370/52; B60K 2370/1529; B60K 2370/177
USPC ............................................. 345/1.1, 1.2, 1.3
See application file for complete search history.

(56) References Cited

U.S. PATENT DOCUMENTS

| | | |
|---|---|---|
| 2011/0262104 A1 | 10/2011 | Kiyosawa et al. |
| 2016/0104455 A1* | 4/2016 | Chiu ....................... G09G 5/12 345/1.3 |
| 2019/0009796 A1 | 1/2019 | Fujii et al. |

* cited by examiner

DISPLAY CONTROL SYSTEM, MOBILE BODY, DISPLAY CONTROL METHOD, DISPLAY DEVICE, DISPLAY METHOD, AND RECORDING MEDIUM

CROSS REFERENCE TO RELATED APPLICATIONS

This is a continuation application of PCT International Application No. PCT/JP2020/041837 filed on Nov. 10, 2020, designating the United States of America, which is based on and claims priority of Japanese Patent Application No. 2019-227019 filed on Dec. 17, 2019.

FIELD

The present disclosure relates to a display control system, a mobile body, a display control method, a display device, a display method, and a recording medium.

BACKGROUND

Conventionally, a technique for controlling a plurality of display devices has been disclosed (for example, Patent Literature (PTL) 1). With this technique, the plurality of display devices can be caused to display related information in cooperation with each other.

CITATION LIST

Patent Literature

PTL 1: WO 2010/103827

SUMMARY

However, the technique disclosed in above-described PTL 1 can be improved upon.

Accordingly, the present disclosure provides a display control system and the like capable of improving upon the above related art.

In order to achieve the object described above, a display control system according to an aspect of the present disclosure includes: a plurality of display devices; and a display controller that causes the plurality of display devices to display related information in cooperation with each other. The display controller generates, for each frame, a graphics command for causing each of the plurality of display devices to perform rendering processing, and attaches, to the graphics command, time stamp corresponding to an order of generation of the graphics command. Each of the plurality of display devices: acquires the graphics command; performs first processing and second processing in parallel, the first processing being processing of acquiring only the time stamp attached to the graphics command in the order of generation, and the second processing being processing of performing rendering processing based on the graphics command in the order of generation and acquiring the time stamp attached to the graphics command based on which the rendering processing is performed; determines whether a difference between latest time stamp acquired in the first processing and latest time stamp acquired in the second processing exceeds a predetermined threshold value; and when the difference exceeds the predetermined threshold value, performs reduction processing for reducing a load on the rendering processing.

Also, in order to achieve the object described above, a mobile body according to an aspect of the present disclosure includes: the display control system described above; and a main body on which the display control system is mounted.

Also, in order to achieve the object described above, a display control method according to an aspect of the present disclosure is a display control method performed by a display control system including a plurality of display devices and a display controller that causes the plurality of display devices to display related information in cooperation with each other, the display control method including: by the display controller, generating, for each frame, a graphics command for causing each of the plurality of display devices to perform rendering processing, and attaching, to the graphics command, time stamp corresponding to an order of generation of the graphics command; by each of the plurality of display devices, acquiring the graphics command; performing first processing and second processing in parallel, the first processing being processing of acquiring only the time stamp attached to the graphics command in the order of generation, and the second processing being processing of performing rendering processing based on the graphics command in the order of generation and acquiring the time stamp attached to the graphics command based on which the rendering processing is performed; determining whether a difference between latest time stamp acquired in the first processing and latest time stamp acquired in the second processing exceeds a predetermined threshold value; and when the difference exceeds the predetermined threshold value, performing reduction processing for reducing a load on the rendering processing.

Also, in order to achieve the object described above, a display device according to an aspect of the present disclosure is a display device that is, in a display control system including a plurality of display devices and a display controller that causes the plurality of display devices to display related information in cooperation with each other, one of the plurality of display devices, wherein the display device: acquires a graphics command generated for each frame by the display controller, the graphics command being a command that causes each of the plurality of display devices to perform rendering processing and to which time stamp corresponding to an order of generation of the graphics command is attached; performs first processing and second processing in parallel, the first processing being processing of acquiring only the time stamp attached to the graphics command in the order of generation, and the second processing being processing of performing rendering processing based on the graphics command in the order of generation and acquiring the time stamp attached to the graphics command based on which the rendering processing is performed; determines whether a difference between latest time stamp acquired in the first processing and latest time stamp acquired in the second processing exceeds a predetermined threshold value; and when the difference exceeds the predetermined threshold value, performs reduction processing for reducing a load on the rendering processing.

Also, in order to achieve the object described above, a display method according to an aspect of the present disclosure is a display method performed by a display device included in a display control system including a plurality of display devices and a display controller that causes the plurality of display devices to display related information in cooperation with each other, the display method including: acquiring a graphics command generated for each frame by the display controller, the graphics command being a command that causes each of the plurality of display devices to perform rendering processing and to which time stamp corresponding to an order of generation of the graphics command is attached; performing first processing and second processing in parallel, the first processing being processing of acquiring only the time stamp attached to the graphics command in the order of generation, and the second processing being processing of performing rendering processing based on the graphics command in the order of generation and acquiring the time stamp attached to the graphics command based on which the rendering processing is performed; determining whether a difference between latest time stamp acquired in the first processing and latest time stamp acquired in the second processing exceeds a predetermined threshold value; and when the difference exceeds the predetermined threshold value, performing reduction processing for reducing a load on the rendering processing.

Also, in order to achieve the object described above, a recording medium according to an aspect of the present disclosure is a non-transitory computer-readable recording medium having recorded thereon a program for causing a computer to execute the display method described above.

Advantageous Effects of Invention

According to the present disclosure, it is possible to suppress differences in rendering timing between the display devices.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENTS

Embodiment 1

There is a problem in that in the case where a plurality of display devices are caused to display related information in cooperation with each other, if the display devices have different GPU (Graphics Processing Unit) performances, differences occur in rendering timing between the display devices.

Accordingly, the present disclosure provides a display control system and the like, with which the differences in rendering timing between the display devices can be suppressed.

Hereinafter, a display control system and a display device according to an embodiment will be described with reference to the drawings.

Figure 1:
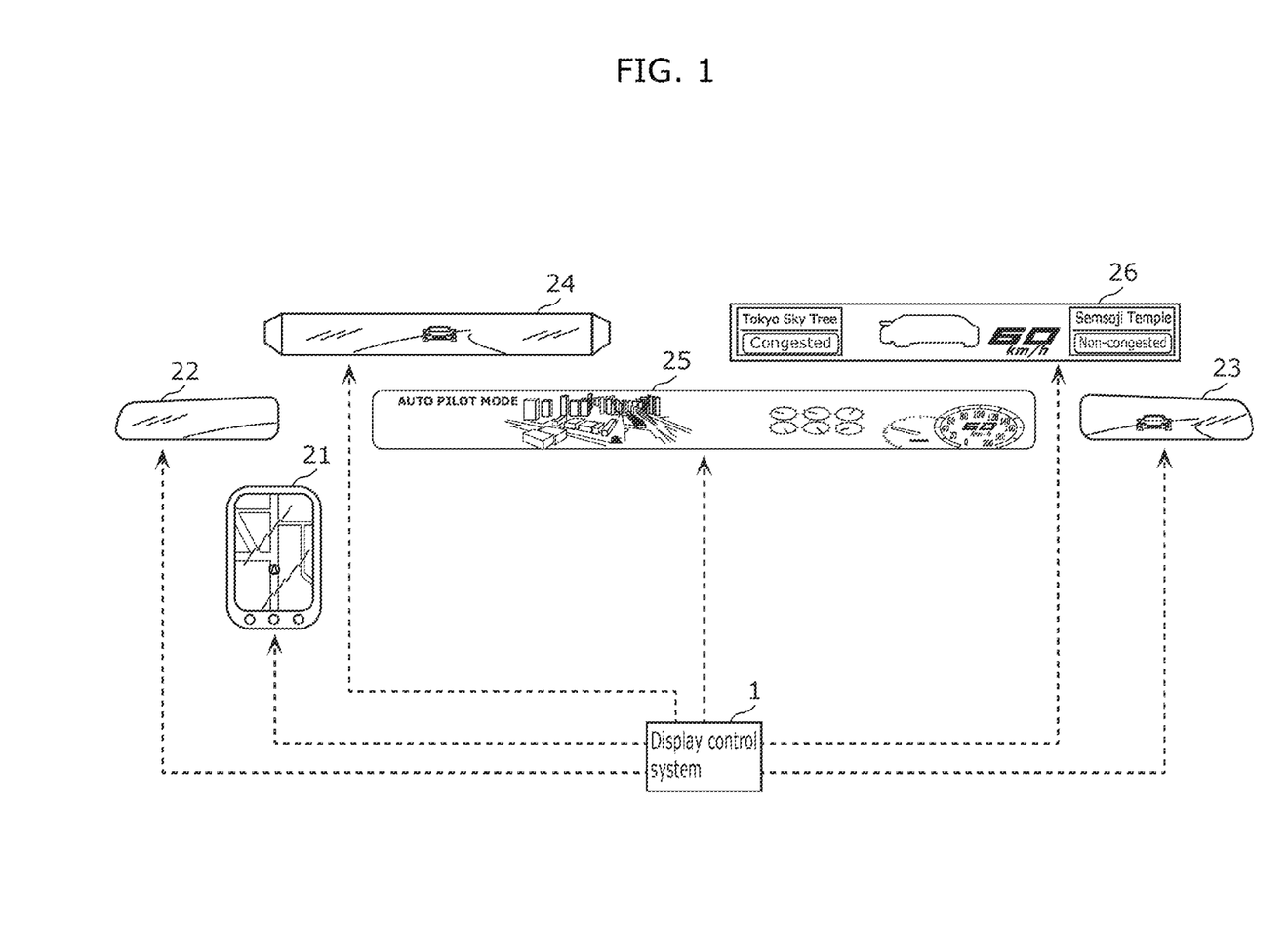
FIG. 1 is a diagram showing an example of displays controlled by a display control system according to an embodiment.

FIG. 1 is a diagram showing an example of displays controlled by display control system 1 according to the embodiment.

Display control system 1 is a system that can cause a plurality of display devices to display related information in cooperation with each other. As shown in FIG. 1, for example, display control system 1 causes physically separated displays 21, 22, 23, 24, 25, and 26 to display related information. Display control system 1 is mounted on a mobile body such as, for example, an automobile. Displays 21, 22, 23, 24, 25, and 26 are, for example, a display of a car navigation system, displays of an electronic mirror system, a multi-information display, a head-up display, or the like that are mounted on the mobile body. Display 21 is a display of a car navigation system. Display 22 is a display of an electronic mirror system that functions as the left-side mirror of the mobile body. Display 23 is a display of the electronic mirror system that functions as the right-side mirror of the mobile body. Display 24 is a display of the electronic mirror system that functions as the back mirror of the mobile body. Display 25 is a multi-information display. Display 26 is a head-up display.

Display control system 1 causes the plurality of displays 21, 22, 23, 24, 25, and 26 to display various types of driving assistance information such as, for example, navigation information, captured images, vehicle speed information, nearby pedestrian information, nearby vehicle information, lane departure information, vehicle state information, and traffic congestion information such that the driver of the mobile body can visually recognize the information. The captured images refer to images obtained by capturing the surroundings (outside) of the mobile body. The nearby pedestrian information and the nearby vehicle information respectively refer to information that indicates the presence of a pedestrian in the surroundings of the mobile body and the distance from the pedestrian, and information that indicates the presence of a vehicle in the surroundings of the mobile body and the distance from the vehicle.

Display control system 1 can not only cause the physically separated displays 21, 22, 23, 24, 25, and 26 to display different screens, but also cause the plurality of displays 21, 22, 23, 24, 25, and 26 to display single related information. Display control system 1 can cause the plurality of displays 21, 22, 23, 24, 25, and 26 to display single related information by collectively controlling a plurality of display devices (which will be described later) that render images (frames) on the plurality of displays 21, 22, 23, 24, 25, and 26. In other words, display control system 1 deems the plurality of displays 21, 22, 23, 24, 25, and 26 as a single display, and causes single related information to be displayed across the plurality of displays 21, 22, 23, 24, 25, and 26. Here, it is sufficient that the related information that is displayed across the plurality of displays 21, 22, 23, 24, 25, and 26 is displayed across at least two displays, and the single related information does not necessarily need to be displayed across all of the plurality of displays 21, 22, 23, 24, 25, and 26.

Figure 2:
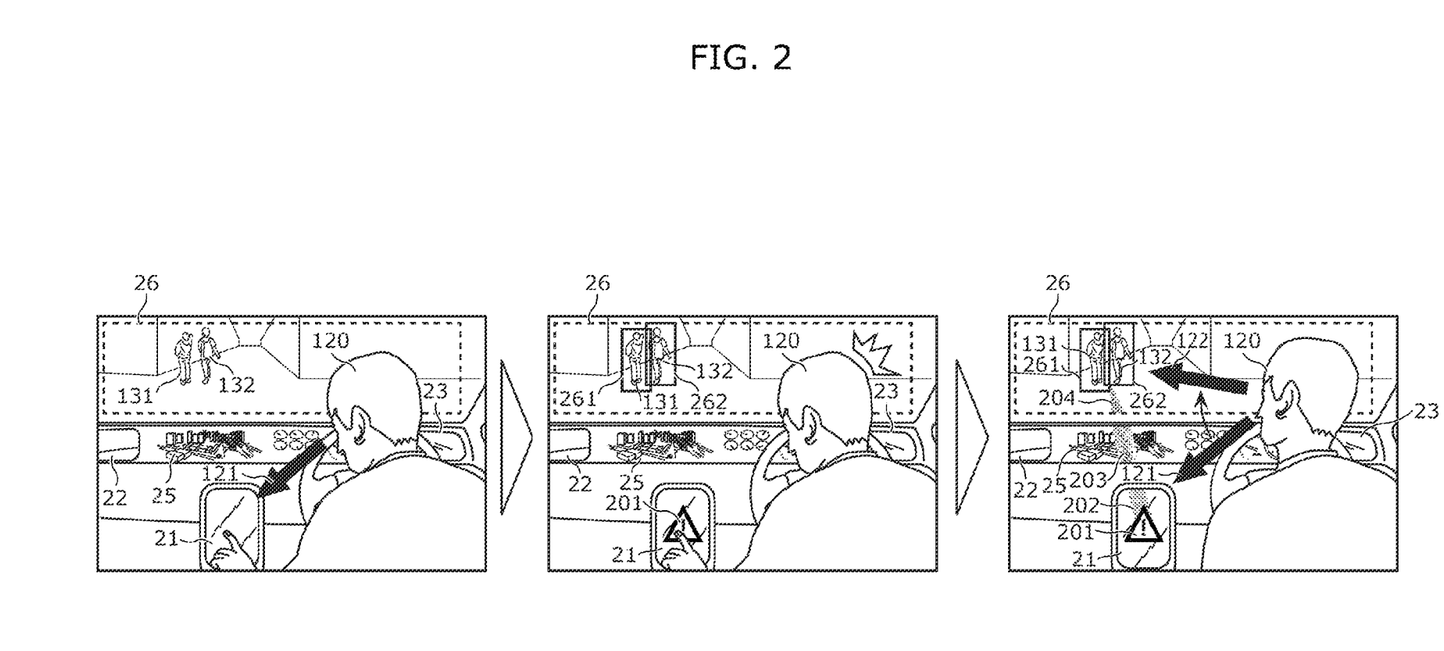
FIG. 2 is a diagram showing an example of application of the display control system according to the embodiment.

FIG. 2 is a diagram showing an example of application of display control system 1 according to the embodiment. FIG. 2 shows a state in which pedestrians 131 and 132 appear in front of the mobile body while driver 120 is looking at display 21, and thus driver 120 is guided to move the line of sight (gazing direction) toward pedestrians 131 and 132 who are in front of the mobile body. Whether driver 120 is looking at display 21 can be determined by detecting, for example, the direction of the driver's eyes or the like by using a line-of-sight detector included in an advanced driver-assistance system, or the like.

First, as shown in the diagram on the left side of FIG. 2, display control system 1 causes displays 21, 22, 23, 24, 25, and 26 to display different images. Driver 120 is looking at display 21 to operate display 21, and thus line of sight 121 of driver 120 is directed toward display 21.

After that, as shown in the diagram at the center of FIG. 2, pedestrians 131 and 132 who are in front of mobile body 100 are detected, and display control system 1 causes display 26 to display frame-shaped virtual images 261 and 262 that respectively surround pedestrians 131 and 132. At this time, display control system 1 causes display 21 to cooperate with display 26 and display icon 201 that warns driver 120 to be careful. Accordingly, driver 120 looking at display 21 can notice that some kind of event has occurred.

After that, as shown in the diagram on the right side of FIG. 2, display control system 1 causes displays 21 and 25 to cooperate with display 26 and causes displays 21 and 25 to respectively display icons 202 and 203 that guide driver 120 to move the line of sight. Furthermore, display control system 1 causes display 26 to display icon 204 that guides driver 120 to move the line of sight. Icons 202, 203, and 204 together form an image (arrow image) like a light streak extending from icon 201 that is displayed on display 21 toward virtual images 261 and 262 that are displayed on display 26, as viewed from driver 120. The displayed images (the icons and the arrow image) are merely an example, and a simple straight line, a dotted line, a character string, or the like may be displayed.

Accordingly, as shown in the diagram on the right side of FIG. 2, driver 120 is guided to move line of sight 121 toward virtual images 261 and 262 that are displayed on display 26. Thus, driver 120 moves line of sight 121 toward pedestrians 131 and 132 who are in front of the mobile body.

As described above, display control system 1 can cause related information to be displayed across the plurality of displays 21, 22, 23, 24, 25, and 26. In the example shown in FIG. 2, icons 201, 202, 203, and 204 that guide driver 120 to move line of sight 121 toward virtual images 261 and 262 are displayed as the related information across displays 21, 25, and 26.

A specific configuration for implementing a function of display control system 1, the function causing a plurality of display devices to display related information in cooperation with each other, will be described with reference to FIGS. 3 and 4.

Figure 3:
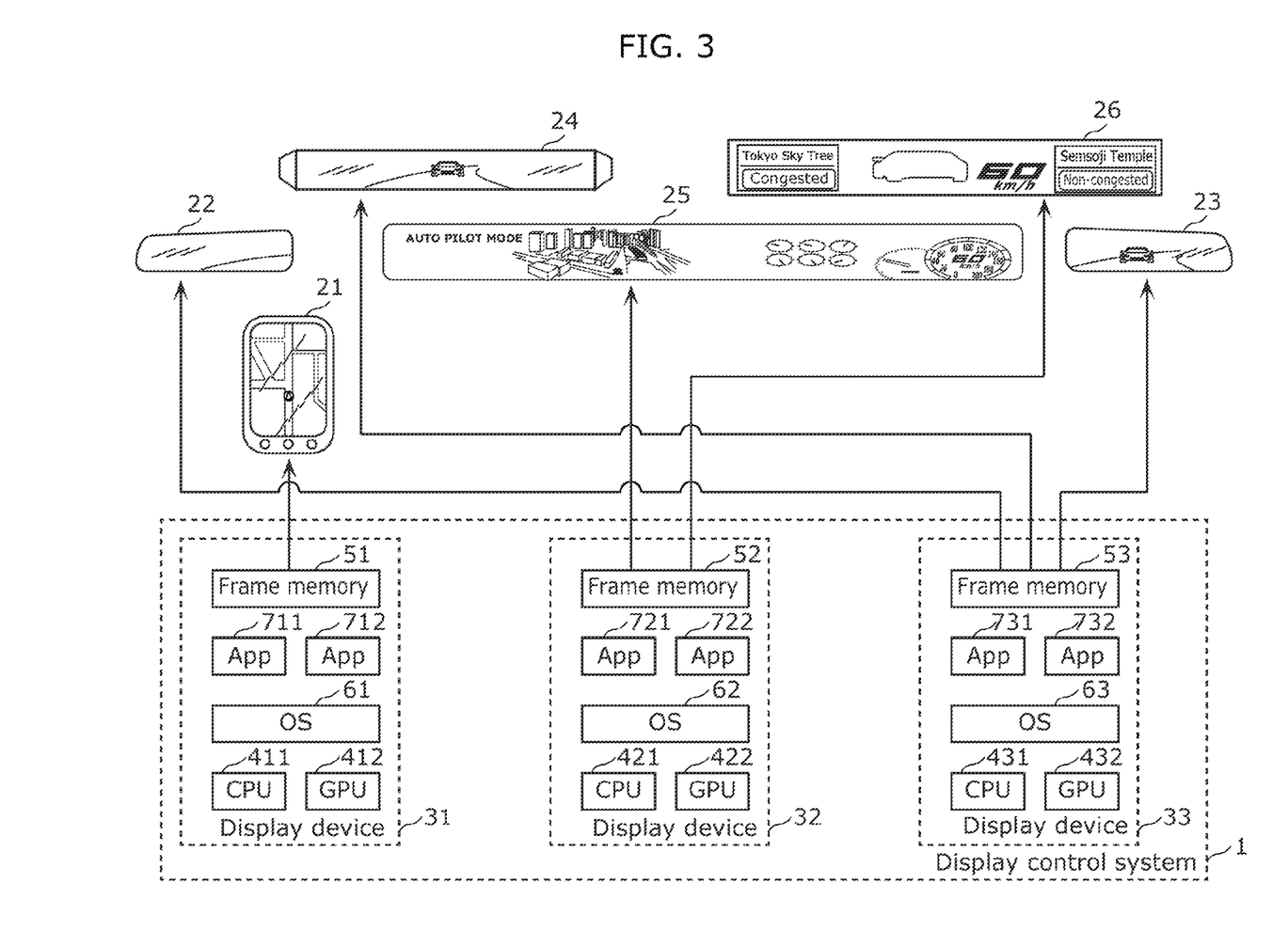
FIG. 3 is a configuration diagram showing an example of the display control system according to the embodiment.

FIG. 3 is a configuration diagram showing an example of display control system 1 according to the embodiment.

Figure 4:
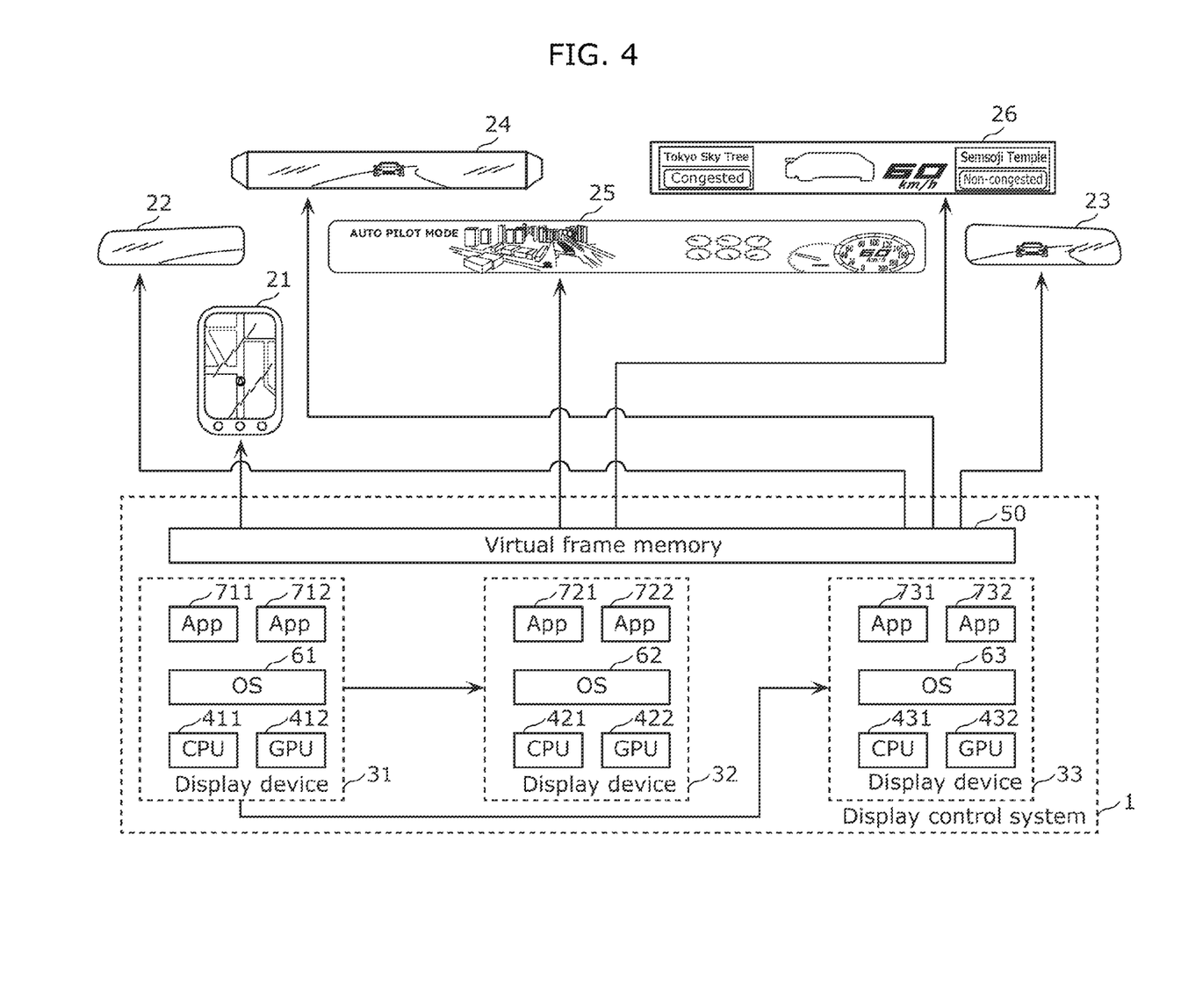
FIG. 4 is a configuration diagram showing an example of the display control system according to the embodiment in which a virtual frame memory is constructed.

FIG. 4 is a configuration diagram showing an example of display control system 1 according to the embodiment in which virtual frame memory 50 is constructed.

Display control system 1 is a system that includes a plurality of display devices and a display controller that causes the plurality of display devices to display related information in cooperation with each other. As shown in FIGS. 3 and 4, display control system 1 includes, for example, a plurality of display devices 31, 32, and 33. The plurality of display devices 31, 32, and 33 are, for example, ECUs (Electronic Control Units) that are mounted on the mobile body. For example, any one of the plurality of display devices 31, 32, and 33 functions as the display controller, and causes the plurality of display devices 31, 32, and 33 including the display device that functions as the display controller to display related information in cooperation with each other. Here, an example will be described in which display device 31 functions as the display controller, and causes the plurality of display devices 31, 32, and 33 to display related information in cooperation with each other.

Display control system 1 includes single virtual frame memory 50 that stores one or more information items to be displayed by the plurality of display devices. Specifically, as shown in FIG. 4, display control system 1 includes virtual frame memory 50 that stores related information (for example, screens) that is displayed across the plurality of displays 21, 22, 23, 24, 25, and 26. The display controller is configured to write, into virtual frame memory 50, information that is displayed across at least two of the plurality of display devices. Specifically, the display controller (for example, display device 31) is configured to write, into virtual frame memory 50, screens that are displayed across the plurality of displays 21, 22, 23, 24, 25, and 26. The virtual frame memory refers to a virtual memory that is set by an OS (Operating System) or the like to have a continuous storage area by using one or more physical memories (non-transitory storage media).

The plurality of display devices 31, 32, and 33 are physically separated structural elements in display control system 1. The plurality of display devices 31, 32, and 33 are, for example, devices each including a processor (including a CPU (Central Processing Unit) and a GPU (Graphics Processing Unit)), a memory, a communication interface, and the like. The plurality of display devices 31, 32, and 33 are connected to each other so as to be capable of communication via the communication interfaces. Although the plurality of display devices 31, 32, and 33 are physically separated structural elements in display control system 1, they may be connected to each other via a communication line or the like. The memory includes a ROM (Read Only Memory), a RAM (Random Access Memory), and the like, and can store a program that is executed by the processor. For example, as a result of the processor operating in accordance with the program, the function that causes the plurality of display devices 31, 32, and 33 to display related information in cooperation with each other is implemented.

Display device 31 includes CPU 411 and GPU 412. Likewise, display device 32 includes CPU 421 and GPU 422, and display device 33 includes CPU 431 and GPU 432. GPUs 412, 422, and 432 execute rendering computation processing that conforms to, for example, the OpenGL (Open Graphics Library).

Also, display device 31 includes frame memory 51, display device 32 includes frame memory 52, and display device 33 includes frame memory 53. The frame memory refers to a memory (frame buffer) for storing one image (frame) worth of content (display state) to be displayed on each of the plurality of displays 21, 22, 23, 24, 25, and 26. Frame memories 51, 52, and 53 may be dedicated memories, or may be configured in a partial area of the memory of the computer system.

Display control system 1 includes a plurality of processors (specifically, GPUs 412, 422, and 432) that are in one-to-one correspondence with a plurality of groups into which the plurality of displays 21, 22, 23, 24, 25, and 26 are classified. Also, display control system 1 includes frame memories 51, 52, and 53 that are in one-to-one correspondence with GPUs 412, 422, and 432 and constitute virtual frame memory 50. For example, the plurality of displays 21, 22, 23, 24, 25, and 26 are classified into any one of a first group, a second group, and a third group. For example, display 21 belongs to the first group, displays 25 and 26 belong to the second group, and displays 22, 23, and 24 belong to the third group. GPU 412 corresponds to the first group and frame memory 51, GPU 422 corresponds to the second group and frame memory 52, and GPU 432 corresponds to the third group and frame memory 53.

Here, GPUs 412, 422, and 432 are each configured to generate a screen that is displayed on any one of the displays that belongs to the corresponding group by writing it into the corresponding one of frame memories 51, 52, and 53 based on a graphics command. The graphics command refers to a command (instruction) for causing each of the plurality of display devices 31, 32, and 33 to perform rendering processing, and specifically, a command for causing each of GPUs 412, 422, and 432 to render an image into the frame memory, or in other words, writing an image into the frame memory. For example, GPU 412 generates an image that is displayed on display 21 that belongs to the first group by writing it into frame memory 51 based on the graphics command. GPU 422 generates an image that is displayed on at least one of display 25 or 26 that belongs to the second group by writing it into frame memory 52 based on the graphics command. GPU 432 generates an image that is displayed on at least one of display 22, 23, or 24 that belongs to the third group by writing it into frame memory 53 based on the graphics command.

For example, in display device 31, CPU 411, GPU 412, and frame memory 51 are connected with a bus, and when GPU 412 causes display 21 to display an image, the content stored in frame memory 51 is rewritten, the content stored in frame memory 51 is transmitted to display 21 at a fixed timing, and the content displayed on display 21 is updated. The same configuration as that of display device 31 is also used in display devices 32 and 33. Also, as described above, display devices 31, 32, and 33 are configured so as to be capable of performing communication with each other based on a communication standard that conforms to, for example, the Ethernet (registered trademark). Display devices 31, 32, and 33 may perform communication based on, for example, a communication standard such as the CAN (Controller Area Network).

FIG. 3 conceptually shows a structure in which OSes run on hardware, and application software (apps) run on the OSes, in the form of separate layers such as a hardware layer including CPUs, GPUs, and the like, an OS layer, and an application layer. For example, in display device 31, OS 61 runs on hardware, and application software 711 and application software 712 run on OS 61. In display device 32, OS 62 runs on hardware, and application software 721 and application software 722 run on OS 62. In display device 33, OS 63 runs on hardware, and application software 731 and application software 732 run on OS 63.

As shown in FIG. 4, display control system 1 implements virtual frame memory 50 by using software (a computer program).

Virtual frame memory 50 is constructed on OSes 61, 62, and 63 of the plurality of display devices 31, 32, and 33 by using frame memories 51, 52, and 53. Virtual frame memory 50 stores screens to be displayed on the plurality of displays 21, 22, 23, 24, 25, and 26. Display control system 1 is configured to write, into virtual frame memory 50, a screen that is displayed across the plurality of displays 21, 22, 23, 24, 25, and 26. That is, unlike frame memories 51, 52, and 53 that allow only limited displays and GPUs to access the frame memories, virtual frame memory 50 can be accessed uniformly from all of the plurality of displays 21, 22, 23, 24, 25, and 26 and the plurality of GPUs 412, 422, and 432. For this reason, the screen written into virtual frame memory 50 can be displayed across the plurality of displays 21, 22, 23, 24, 25, and 26.

FIG. 4 conceptually shows a structure in which OSes run on hardware, and application software run on the OSes, in the form of separate layers such as a hardware layer, an OS layer, and an application layer. Furthermore, in FIG. 4, virtual frame memory 50 that is constructed on OSes 61, 62, and 63 of the plurality of display devices 31, 32, and 33 is shown in place of frame memories 51, 52, and 53.

As shown in FIG. 4, display control system 1 includes virtual frame memory 50, and therefore seamless rendering computation processing is possible between display devices 31, 32, and 33. For example, as a result of display device 31 functioning as the display controller, application software 711 installed on display device 31 can directly perform rendering, not only on display 21 that belongs to the first group, but also on displays 25 and 26 that belong to the second group and displays 22, 23, and 24 that belong to the third group via virtual frame memory 50.

As described above, the function of display control system 1, the function causing the plurality of display devices 31, 32, and 33 to display related information in cooperation with each other on the plurality of displays 21, 22, 23, 24, 25, and 26, is implemented.

However, if the plurality of display devices 31, 32, and 33 that render images on the plurality of displays 21, 22, 23, 24, 25, and 26 have different GPU performances, when single related information is displayed on the plurality of displays 21, 22, 23, 24, 25, and 26 in cooperation with each other, a problem arises in that differences occur in rendering timing between the display devices. For example, the image in the form of a light streak may be displayed with a break as a result of one of icons 202, 203, and 204 shown in FIG. 2 being displayed with a delay, and it may not be possible to properly guide driver 120 to move the line of sight.

In contrast, display control system 1 has a function of suppressing differences in rendering timing between the display devices. For example, the function of suppressing differences in rendering timing between the display devices is implemented by the processors of the display devices operating in accordance with the program. This function will be described in detail with reference to FIGS. 5 and 6.

Figure 5:
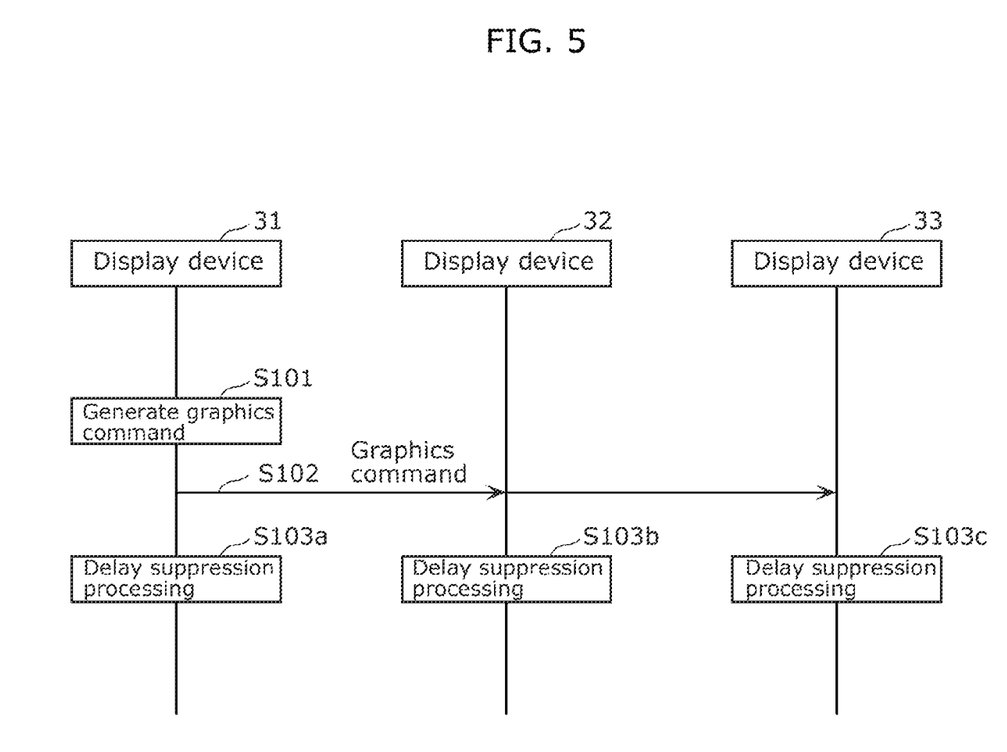
FIG. 5 is a sequence diagram illustrating an example of operations performed in the display control system according to the embodiment.

FIG. 5 is a sequence diagram illustrating an example of operations performed in display control system 1 according to the embodiment. For example, display device 31 is configured to function as the display controller that causes the plurality of display devices 31, 32, and 33 to display related information in cooperation with each other.

Display device 31 generates a graphics command for each frame, the graphics command being a command that causes each of the plurality of display devices 31, 32, and 33 to perform rendering processing (step S101). Also, display device 31 attaches, to each graphics command, time stamp corresponding to the order of generation of the graphics command. For example, display device 31 generates a graphics command and attaches, to the graphics command, the time at which the graphics command was generated, as the time stamp. That is, the earlier a graphics command is generated, the earlier a frame corresponding to the generated graphics command is displayed, and the earlier time is indicated by the attached time stamp. A duration of time elapsed from the time when the first graphics command was generated may be used as the time stamp.

Display device 31 transmits a graphics command with time stamp attached thereto to each of display devices 32 and 33 (step S102). For example, display device 31 transmits graphics commands in the order of generation.

Then, each of the plurality of display devices 31, 32, and 33 performs delay suppression processing by using the graphics command with time stamp attached thereto (steps S103*a*, S103*b*, and S103*c*). Display devices 32 and 33 each perform delay suppression processing by using the graphics command transmitted from display device 31, and display device 31 performs delay suppression processing by using the graphics command generated by display device 31. The delay suppression processing will be described with reference to FIG. 6.

Figure 6:
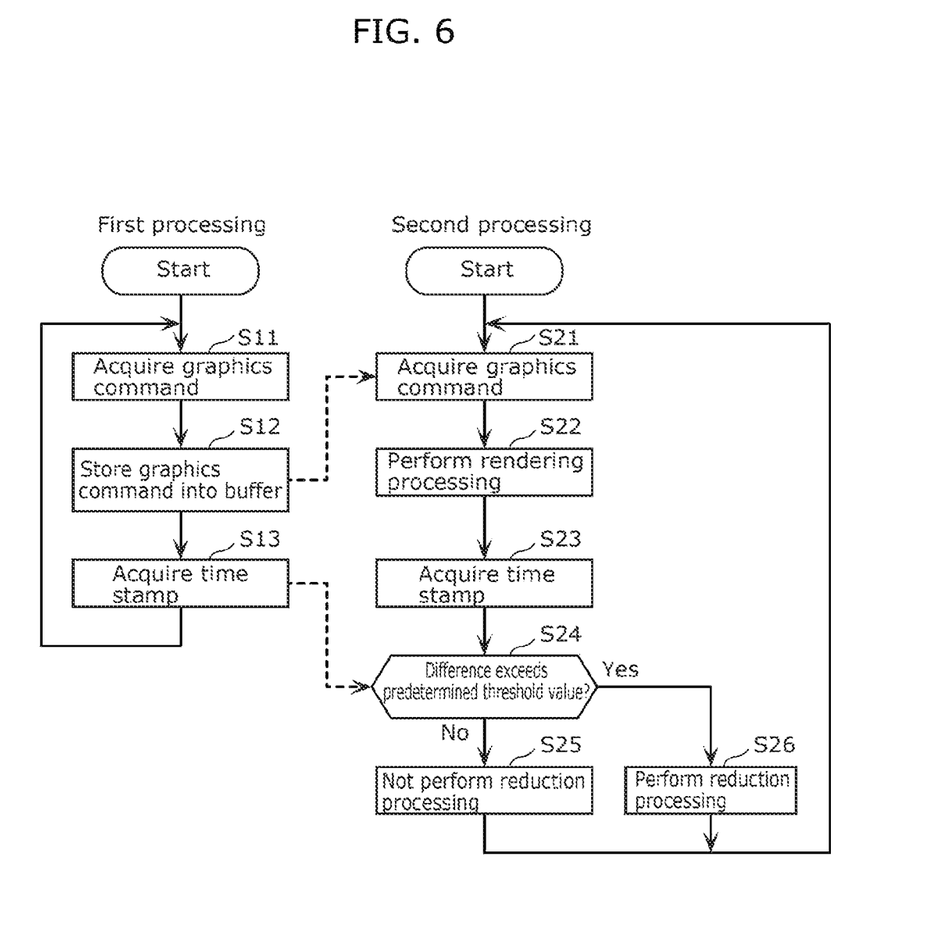
FIG. 6 is a flowchart illustrating an example of operations performed by a display device according to the embodiment.

FIG. 6 is a flowchart illustrating an example of operations performed by the display device according to the embodiment. The following description will be given focusing on, for example, display device 32, but the other display devices perform the same operations. Display device 32 performs first processing and second processing in parallel. First, the first processing will be described.

Display device 32 first acquires a graphics command with time stamp attached thereto (step S11). For example, display device 32 acquires graphics commands transmitted in the order of generation.

Next, display device 32 stores the acquired graphics command into a buffer (step S12). The graphics command stored in the buffer is used in the second processing.

Next, display device 32 acquires only the time stamp that is attached to the acquired graphics command (step S13). In the first processing, rendering processing based on the graphics command is not performed, and only the operation of acquiring time stamp is performed.

Then, the processing starting from step S11 is again performed on the next graphics command in the order of generation. That is, in the first processing, display device 32 acquires only the time stamp attached to each of the graphics commands transmitted in the order of generation.

Next, the second processing will be described.

Display device 32 first acquires a graphics command stored in the buffer (step S21). For example, display device 32 acquires graphics commands in the order of generation. In the second processing, as will be described later, after a graphics command is acquired, not only the operation of acquiring time stamp, but also rendering processing is performed based on the graphics command, and thereafter, the next graphics command is acquired. Accordingly, the speed at which graphics commands are stored into the buffer in the first processing in which rendering processing is not performed is faster than the speed at which graphics commands are output from the buffer in the second processing. For this reason, display device 32 acquires graphics commands that are accumulated in the buffer.

Next, display device 32 performs rendering processing in accordance with the acquired graphics command (step S22). The lower the performance of GPU 422 of display device 32 is, the more time is required to perform rendering processing, and a rendering delay occurs.

Next, display device 32 acquires the time stamp attached to the graphics command based on which the rendering processing in step S22 was performed (or in other words, the graphics command acquired in step S21) (step S23). Display device 32 may acquire the time stamp attached to the graphics command before the rendering processing in step S22 is performed. That is, display device 32 may perform rendering processing after it has acquired the time stamp.

Next, display device 32 calculates a difference between the latest time stamp acquired in the first processing and the latest time stamp acquired in the second processing, and determines whether the difference exceeds a predetermined threshold value (step S24). There is no particular limitation on the predetermined threshold value, and the predetermined threshold value is set as appropriate according to the specifications of display control system 1 or the like.

If the difference does not exceed the predetermined threshold value (No in step S24), display device 32 does not perform reduction processing for reducing a load on the rendering processing (step S25).

Then, the processing starting from step S21 is again performed on the next graphics command in the order of generation. That is, in the second processing, display device 32 performs rendering processing in accordance with each of graphics commands in the order of generation of the graphics commands, and acquires time stamp attached to the graphics command based on which the rendering processing is performed.

In the second processing, not only the operation of acquiring time stamp is performed, but also rendering processing is performed, and thus it takes more time to finish a single loop of the second processing as compared with the time required to finish a single loop of the first processing. Accordingly, in the first processing, the time stamp is acquired at a pace faster than that in the second processing, and thus the time indicated by the latest time stamp acquired in the first processing is earlier than the time indicated by the latest time stamp acquired in the second processing. For example, in a state in which only a short period of time has elapsed since the start of graphics command acquiring operation, the difference between the latest time stamp acquired in the first processing and the latest time stamp acquired in the second processing is small, but the difference increases gradually as the time elapses (or in other words, as the number of graphics commands acquired increases) if the performance of GPU 422 is low.

For example, if the plurality of display devices 31, 32, and 33 have different GPU performances, the time required for rendering processing also varies between the plurality of display devices 31, 32, and 33, and thus differences occur in rendering timing between the display devices.

Accordingly, display device 32 performs a loop of the first processing and a loop of the second processing in parallel. If the difference between the latest time stamp acquired in the first processing and the latest time stamp acquired in the second processing exceeds a predetermined threshold value (Yes in step S24), display device 32 performs reduction processing for reducing a load on the rendering processing (step S26). There is no particular limitation on the reduction processing for reducing a load on the rendering processing, but the reduction processing may be, for example, frame rate reduction processing or resolution reduction processing. Through the reduction processing, the load on the rendering processing is reduced, or in other words, the time required to perform rendering processing is shortened (or in other words, the rendering delay is suppressed). The other display devices, namely, display devices 31 and 33 also perform the reduction processing for reducing a load on the rendering processing if the difference exceeds the predetermined threshold value. Accordingly, the rendering delay is suppressed in each of the plurality of display devices 31, 32, and 33, and the differences in rendering timing between the display devices can also be suppressed.

As described above, display control system 1 includes a plurality of display devices 31, 32, and 33 and a display controller (for example, display device 31) that causes the plurality of display devices 31, 32, and 33 to display related information in cooperation with each other. The display controller generates, for each frame, a graphics command for causing each of the plurality of display devices 31, 32, and 33 to perform rendering processing, and attaches, to the graphics command, time stamp corresponding to an order of generation of the graphics command. Each of the plurality of display devices 31, 32, and 33 acquires the graphics command, and performs first processing and second processing in parallel, the first processing being processing of acquiring only the time stamp attached to the graphics command in the order of generation of the graphics command, and the second processing being processing of performing rendering processing based on the graphics command in the order of generation of the graphics command and acquiring the time stamp attached to the graphics command based on which the rendering processing is performed. Then, each of the plurality of display devices 31, 32, and 33 determines whether a difference between latest time stamp acquired in the first processing and latest time stamp acquired in the second processing exceeds a predetermined threshold value, and if the difference exceeds the predetermined threshold value, performs reduction processing for reducing a load on the rendering processing.

With the configuration described above, in each of the plurality of display devices 31, 32, and 33, if a large difference occurs between the latest time stamp acquired in the first processing in which the influence of the load on the rendering processing is small and the latest time stamp acquired in the second processing in which the influence of the load on the rendering processing is large, or in other words, if a large rendering delay occurs due to the load on the rendering processing, the load on the rendering processing is reduced. Accordingly, even if the plurality of display devices 31, 32, and 33 have different GPU performances, the rendering delay is suppressed in each of the plurality of display devices 31, 32, and 33, and it is therefore possible to suppress the differences in rendering timing between the display devices of display control system 1.

Also, the reduction processing for reducing the load on the rendering processing may be frame rate reduction processing or resolution reduction processing.

The load on the rendering processing can be reduced by reducing the frame rate or the resolution in the manner described above.

Also, a mobile body according to an aspect of the present disclosure includes display control system 1 and a main body on which display control system 1 is mounted.

With this configuration, it is possible to apply display control system 1 to a mobile body, and provide the mobile body in which differences in rendering timing between the display devices of display control system 1 can be suppressed.

Also, a display device according to an aspect of the present disclosure (for example, display device 32) is, in display control system 1 that includes a plurality of display devices 31, 32, and 33 and a display controller that causes the plurality of display devices 31, 32, and 33 to display related information in cooperation with each other, one of the plurality of display devices 31, 32, and 33. Display device 32 acquires a graphics command generated for each frame by the display controller, the graphics command being a command that causes each of the plurality of display devices 31, 32, and 33 to perform rendering processing and to which time stamp corresponding to an order of generation of the graphics command is attached. Display device 32 performs first processing and second processing in parallel, the first processing being processing of acquiring only the time stamp attached to the graphics command in the order of generation of the graphics command, and the second processing being processing of performing rendering processing based on the graphics command in the order of generation of the graphics command and acquiring the time stamp attached to the graphics command based on which the rendering processing is performed. Then, display device 32 determines whether a difference between latest time stamp acquired in the first processing and latest time stamp acquired in the second processing exceeds a predetermined threshold value, and if the difference exceeds the predetermined threshold value, performs reduction processing for reducing a load on the rendering processing.

With this configuration, it is possible to provide a display device, with which differences in rendering timing between the display devices of display control system 1 can be suppressed.

OTHER EMBODIMENTS

Up to here, the embodiment has been described as an example of the technique according to the present disclosure. However, the technique according to the present disclosure is not limited thereto, and is also applicable to embodiments obtained by making modifications, replacements, additions, omissions and the like as appropriate. For example, variations described below are also encompassed in the scope of the embodiment of the present disclosure.

For example, in the embodiment given above, an example has been described in which display device 31 functions as the display controller, and causes display devices 31 and 32 and display device 31 itself to display related information in cooperation with each other. However, the present disclosure is not limited thereto. For example, a configuration is possible in which display device 31 functions as the display controller and causes display devices 32 and 33 to display related information in cooperation with each other. That is, the display controller does not necessarily need to be any one of the plurality of display devices that are caused to display related information in cooperation with each other. Also, depending on the situation, another display device may function as the display controller. Also, the display controller does not necessarily need to be any one of the plurality of display devices 31, 32, and 33, and display control system 1 may include a display controller separately from the plurality of display devices 31, 32, and 33.

For example, each of the plurality of display devices may perform the reduction processing for reducing the load on the rendering processing before the difference between the latest time stamp acquired in the first processing and the latest time stamp acquired in the second processing exceeds the predetermined threshold value when the display device has lower performance relative to the acquired graphics command, and an interval at which the time stamp is acquired in the first processing is significantly shorter than a processing time of processing the graphics command in the second processing. In other words, each of the plurality of display devices may perform the reduction processing for reducing the load on the rendering processing before the difference between the latest time stamp acquired in the first processing and the latest time stamp acquired in the second processing exceeds the predetermined threshold value when the display device calculates a frame rate for the rendering processing based on an interval at which the time stamp is acquired in the first processing, and the second processing is not capable of performing the rendering processing at the calculated frame rate. For example, if the display device is not capable of processing moving images with a frame rate of 120 fps, when the display device recognizes, based on the interval at which the time stamp of two graphics commands are acquired in the first processing, that a moving image with a frame rate of 120 fps is to be reproduced, the display device may perform the reduction processing for reducing the load on the rendering processing (for example, frame rate reduction processing).

The present disclosure can be implemented not only as display control system 1, but also as a display control method including steps (processing operations) performed by structural elements that constitute display control system 1.

Specifically, the display control method is a display control method performed by a display control system including a plurality of display devices and a display controller that causes the plurality of display devices to display related information in cooperation with each other. As shown in FIG. 5, the display controller generates, for each frame, a graphics command for causing each of the plurality of display devices to perform rendering processing, and attaches, to the graphics command, time stamp corresponding to an order of generation of the graphics command (step S101). As shown in FIG. 6, each of the plurality of display devices: acquires the graphics command (step S11); performs first processing and second processing in parallel, the first processing being processing of acquiring only the time stamp attached to the graphics command in the order of generation of the graphics command (step S13), and the second processing being processing of performing rendering processing based on the graphics command in the order of generation of the graphics command (step S22) and acquiring the time stamp attached to the graphics command based on which the rendering processing is performed (step S23); determines whether a difference between latest time stamp acquired in the first processing and latest time stamp acquired in the second processing exceeds a predetermined threshold value (step S24); and when the difference exceeds the predetermined threshold value (Yes in step S24), performs reduction processing for reducing a load on the rendering processing (step S26).

Also, the present disclosure can be implemented not only as a display device, but also as a display method including steps (processing operations) performed by structural elements that constitute the display device.

Specifically, the display method is a display method performed by a display device included in a display control system that includes a plurality of display devices and a display controller that causes the plurality of display devices to display related information in cooperation with each other. As shown in FIG. 6, the method includes: acquiring a graphics command generated for each frame by the display controller, the graphics command being a command that causes each of the plurality of display devices to perform rendering processing and to which time stamp corresponding to an order of generation of the graphics command is attached (step S11); performing first processing and second processing in parallel, the first processing being processing of acquiring only the time stamp attached to the graphics command in the order of generation of the graphics command (step S13), and the second processing being processing of performing rendering processing based on the graphics command in the order of generation of the graphics command (step S22) and acquiring the time stamp attached to the graphics command based on which the rendering processing is performed (step S23); determining whether a difference between latest time stamp acquired in the first processing and latest time stamp acquired in the second processing exceeds a predetermined threshold value (step S24); and when the difference exceeds the predetermined threshold value, performing reduction processing for reducing a load on the rendering processing (step S26).

For example, the steps of the display control method and the display method may be implemented by a computer (computer system). The present disclosure can be implemented as a program for causing a computer to execute the steps of the display control method and the display method.

Furthermore, the present disclosure can be implemented as a non-transitory computer-readable recording medium, such as a CD-ROM, in which the program is recorded.

For example, in the case where the present disclosure is implemented as, for example, a program (software), the steps are executed by the program being executed using hardware resources of the computer including a CPU, a memory, an input/output circuit, and the like. That is, the steps are executed by the CPU acquiring data from the memory, the input/output circuit, or the like, performing computation, and outputting the result of computation to the memory, the input/output circuit, or the like.

Also, the structural elements included in display control system 1 according to the embodiment given above may be implemented as a dedicated circuit or a general-purpose circuit.

Also, the structural elements included in display control system 1 according to the embodiment given above may be implemented as an LSI (Large Scale Integration) that is an integrated circuit (IC).

Also, implementation of an integrated circuit is not limited to an LSI, and may be implemented by a dedicated circuit or a general-purpose processor. It is also possible to use an FPGA (Field Programmable Gate Array) that can be programmed or a reconfigurable processor that enables reconfiguration of the connection and setting of circuit cells in the LSI.

Furthermore, if a technique for implementing an integrated circuit that can replace LSIs by another technique resulting from the progress or derivation of semiconductor technology appears, the structural elements included in display control system 1 may be integrated by using that technique.

Other embodiments obtained by making various modifications that can be conceived by a person having ordinary skill in the art to the above embodiment as well as embodiments implemented by any combination of the structural elements and the functions of the embodiment without departing from the scope of the present disclosure are also included within the scope of the present disclosure.

FURTHER INFORMATION ABOUT TECHNICAL BACKGROUND TO THIS APPLICATION

The disclosures of the following Patent Applications including specification, drawings and claims are incorporated herein by reference in their entirety: Japanese Patent Application No. 2019-227019 filed on Dec. 17, 2019 and PCT International Application No. PCT/JP2020/041837 filed on Nov. 10, 2020.

INDUSTRIAL APPLICABILITY

The present disclosure is applicable to a display device that is mounted on a mobile body, and the like.

The invention claimed is:
1. A display control system, comprising:
a plurality of display devices; and
a display controller that causes the plurality of display devices to display related information in cooperation with each other, wherein the display controller generates, for each frame, a graphics command for causing each of the plurality of display devices to perform rendering processing, and attaches, to the graphics command, time stamp corresponding to an order of generation of the graphics command, each of the plurality of display devices:
    acquires the graphics command;
    performs first processing and second processing in parallel, the first processing being processing of acquiring only the time stamp attached to the graphics command in the order of generation, and the second processing being processing of performing rendering processing based on the graphics command in the order of generation and acquiring the time stamp attached to the graphics command based on which the rendering processing is performed;
    determines whether a difference between latest time stamp acquired in the first processing and latest time stamp acquired in the second processing exceeds a predetermined threshold value; and
    when the difference exceeds the predetermined threshold value, performs reduction processing for reducing a load on the rendering processing.

2. The display control system according to claim 1, wherein the reduction processing is frame rate reduction processing or resolution reduction processing.

3. The display control system according to claim 1, wherein each of the plurality of display devices performs the reduction processing before the difference between the latest time stamp acquired in the first processing and the latest time stamp acquired in the second processing exceeds the predetermined threshold value, when an interval at which the time stamp is acquired in the first processing is shorter than a processing time of processing the graphics command in the second processing.

4. The display control system according to claim 1, wherein each of the plurality of display devices calculates a frame rate for the rendering processing based on an interval at which the time stamp is acquired in the first processing, and when the second processing is not capable of performing the rendering processing at the frame rate, performs the reduction processing before the difference between the latest time stamp acquired in the first processing and the latest time stamp acquired in the second processing exceeds the predetermined threshold value.

5. The display control system according to claim 1, further comprising:
    a single virtual frame memory that stores one or more information items to be displayed by the plurality of display devices,
    wherein the display controller is configured to write, into the single virtual frame memory, information to be displayed across at least two of the plurality of display devices.

6. The display control system according to claim 1, wherein the plurality of display devices are ECUs.

7. A mobile body, comprising:
    the display control system according to claim 1; and
    a main body on which the display control system is mounted.

8. A display control method performed by a display control system including a plurality of display devices and a display controller that causes the plurality of display devices to display related information in cooperation with each other, the display control method comprising:
    by the display controller,
    generating, for each frame, a graphics command for causing each of the plurality of display devices to perform rendering processing, and attaching, to the graphics command, time stamp corresponding to an order of generation of the graphics command;
    by each of the plurality of display devices,
    acquiring the graphics command;
    performing first processing and second processing in parallel, the first processing being processing of acquiring only the time stamp attached to the graphics command in the order of generation, and the second processing being processing of performing rendering processing based on the graphics command in the order of generation and acquiring the time stamp attached to the graphics command based on which the rendering processing is performed;
    determining whether a difference between latest time stamp acquired in the first processing and latest time stamp acquired in the second processing exceeds a predetermined threshold value; and
    when the difference exceeds the predetermined threshold value, performing reduction processing for reducing a load on the rendering processing.

9. A display device that is, in a display control system including a plurality of display devices and a display controller that causes the plurality of display devices to display related information in cooperation with each other, one of the plurality of display devices,
    wherein the display device:
    acquires a graphics command generated for each frame by the display controller, the graphics command being a command that causes each of the plurality of display devices to perform rendering processing and to which time stamp corresponding to an order of generation of the graphics command is attached;
    performs first processing and second processing in parallel, the first processing being processing of acquiring only the time stamp attached to the graphics command in the order of generation, and the second processing being processing of performing rendering processing based on the graphics command in the order of generation and acquiring the time stamp attached to the graphics command based on which the rendering processing is performed;
    determines whether a difference between latest time stamp acquired in the first processing and latest time stamp acquired in the second processing exceeds a predetermined threshold value; and
    when the difference exceeds the predetermined threshold value, performs reduction processing for reducing a load on the rendering processing.

10. A display method performed by a display device included in a display control system including a plurality of display devices and a display controller that causes the plurality of display devices to display related information in cooperation with each other, the display method comprising:
    acquiring a graphics command generated for each frame by the display controller, the graphics command being a command that causes each of the plurality of display devices to perform rendering processing and to which time stamp corresponding to an order of generation of the graphics command is attached;
    performing first processing and second processing in parallel, the first processing being processing of acquiring only the time stamp attached to the graphics command in the order of generation, and the second processing being processing of performing rendering processing based on the graphics command in the order of generation and acquiring the time stamp attached to the graphics command based on which the rendering processing is performed;

determining whether a difference between latest time stamp acquired in the first processing and latest time stamp acquired in the second processing exceeds a predetermined threshold value; and when the difference exceeds the predetermined threshold value, performing reduction processing for reducing a load on the rendering processing.

11. A non-transitory computer-readable recording medium having recorded thereon a program for causing a computer to execute the display method according to claim 10.

* * * * *